United States Patent

[11] 3,626,209

| [72] | Inventor | Robert E. Chandos<br>Santa Barbara, Calif. |
| --- | --- | --- |
| [21] | Appl. No. | 26,038 |
| [22] | Filed | Apr. 6, 1970 |
| [45] | Patented | Dec. 7, 1971 |
| [73] | Assignee | Electro-Optical Industries, Inc. |

[54] SQUARE WAVE GENERATING CIRCUIT
9 Claims, 4 Drawing Figs.

| [52] | U.S. Cl. | 307/268, 307/261 |
| --- | --- | --- |
| [51] | Int. Cl. | H03k 5/00 |
| [50] | Field of Search | 307/261, 265, 268, 271; 328/36, 127, 128 |

[56] References Cited
UNITED STATES PATENTS 3,294,981  12/1966  Bose..................... 328/127 X

*Primary Examiner*—John S. Heyman
*Assistant Examiner*—John Zazworsky
*Attorney*—Finkelstein & Mueth ABSTRACT: A square wave generating circuit for automatically deriving a 50—50 square wave output signal of constant amplitude from a random but repetitive input signal. An operational amplifier utilized as a Schmitt trigger converts the input signal into a rectangular output waveform which is clipped by a back-to-back zener diode arrangement and fed to an operational integrator. The output of the operational integrator controls the threshold levels of the Schmitt trigger in response to the duty cycle of the Schmitt trigger output signal in order to produce a square waveform output from the Schmitt trigger.

PATENTED DEC 7 1971 3,626,209

INVENTOR
ROBERT E. CHANDOS
BY
Finkelstein & Mueth
ATTORNEYS

SQUARE WAVE GENERATING CIRCUIT

BACKGROUND OF THE INVENTION

1. Field of the Invention

This invention relates to signal converters, and more particularly to a circuit for producing square-wave signals from any random but periodic input signal.

DESCRIPTION OF THE PRIOR ART

A known square-wave generator is a simple Schmitt trigger in which the triggering thresholds are adjusted for an input signal so that particular positive- and negative-going excursions of the input signal trigger the Schmitt trigger and produce a square-wave output. While such a device will continue to produce square waves if the frequency of the input signal is changed, variations in the shape or amplitude of the input waveform may result in the Schmitt trigger responding to positive and negative excursions occurring at different points on the cycles, thereby producing a nonsquare-wave output.

Another known square-wave generator is a one-shot multivibrator in which a pulse of fixed duration is generated in response to any input signal. The duration of the pulse is adjusted to occupy one-half cycle so as to produce a square-wave output. While such a device is relatively unaffected by variations in the shape of the input waveform, any variations in the frequency of the input signal results in a nonsquare-wave output since the duration of the output pulses remains fixed and therefore the pulse would occupy more or less than one-half a cycle.

BRIEF DESCRIPTION OF THE INVENTION

It is an object of the present invention to provide a device for automatically generating a square-wave output signal from any input signal of periodic frequency regardless of the amplitude or shape of the input signal.

A further object of the present invention is to provide a device for automatically generating a square-wave output signal from any input signal of periodic frequency regardless of the frequency of the input signal.

SUMMARY OF THE INVENTION

According to the present invention, the foregoing objects are attained by providing an operational amplifier which, in preferred embodiments, is utilized as a Schmitt trigger to receive the input signal. The input signal causes the Schmitt trigger to develop a series of output pulses of fixed high- and low-voltage levels. Means are provided for converting the output pulses into pulses having positive and negative levels of equal magnitude. The converted output pulses are applied, in a preferred embodiment, to an operational integrator which produces a signal that is an integrated version of the converted Schmitt trigger output signal. This integrated signal is applied to the threshold level control of the Schmitt trigger in response to the duty cycle of the Schmitt trigger output signal. If the positive state of the Schmitt trigger is "on" too long, the output of the operational integrator is such that the magnitude of the positive triggering level for the Schmitt trigger is raised causing it to trigger at a later point on the positive excursion of the input signal thereby reducing the duration of the positive state of the Schmitt trigger output. Conversely, if the negative portion of the Schmitt trigger is "on" too long, the output of the operational integrator is such that the magnitude of the positive triggering level for the Schmitt trigger is lowered causing the Schmitt trigger to produce a positive level output at an earlier point of the positive excursion of the input signal thereby increasing the duration of the positive state of the Schmitt trigger output. This automatic adjustment of the duration of the positive level of the Schmitt trigger output signal continues until the positive and negative durations are equal and a square-wave output signal results. The presence of a true integrator, rather than a high-gain amplifier with slow response, assures that the steady-state duration ratio error will truly be zero.

DESCRIPTION OF THE DRAWINGS

The invention will be more readily understood when described in conjunction with the drawing, in which.

DETAILED DESCRIPTION OF THE PREFERRED EMBODIMENTS

Figure 1:
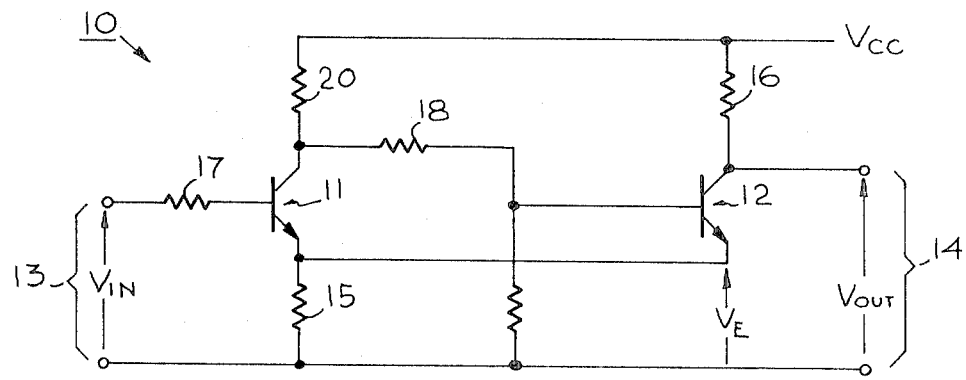
FIG. 1 is a schematic circuit diagram of a Schmitt trigger circuit.

Referring now to FIG. 1, there is presented, for illustration of the principles of operation of the invention, a schematic diagram of a Schmitt trigger circuit 10 having two transistors 11 and 12. A Schmitt trigger is a circuit operable in either of two states and includes signal input terminals 13 and signal output terminals 14. The operating state of the Schmitt trigger depends upon the amplitude of the trigger signal applied to the signal input terminals 13. That is, the Schmitt trigger circuit operates in a first state as long as a trigger signal greater than a threshold value is applied to the signal input terminal. When no trigger signal is applied or when a trigger signal less than a threshold value is applied to the signal input terminal, the Schmitt trigger circuit operates in a second state. When the Schmitt trigger circuit operates in the first state the output signal at the output terminal has a first voltage level. When the Schmitt trigger circuit operates in the second state the voltage of the output signal at the output terminals is at a second level.

Figure 2:
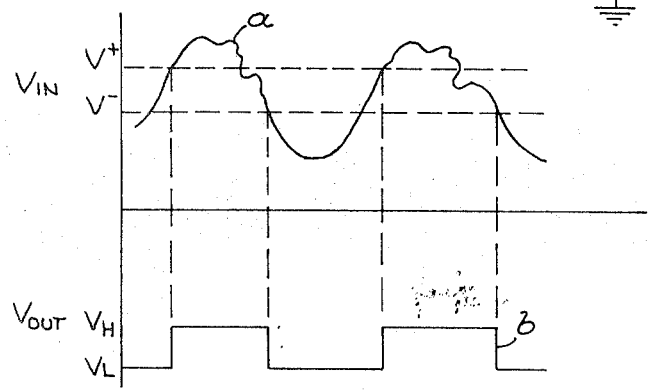
FIG. 2 is a graphical representation of input and output signals of the circuit shown in FIG. 1.

The most common use for a Schmitt trigger is to deliver a stepped output signal from a continuously varying input signal when the input signal exceeds certain set levels or thresholds. The output signal waveform, curve "a", for a typical input signal waveform, curve "b", is shown in FIG. 2. When the input waveform V of curve "a" is increasing, the Schmitt trigger triggers at V⁺ resulting in the output, Vout, switching from voltage V1 to a high voltage level $V_H$ as shown by curve "b." When the input waveform Vin is decreasing the Schmitt trigger triggers at V⁻ causing the output to switch to the original lower voltage level V1. The resulting hysteresis is equal to V⁺−V⁻. This hysteresis may be made small or negative by proper choice of circuit parameters.

Returning now to FIG. 1, a rough analysis of the circuit operation may be obtained as follows. Assume that transistor 11 is cut off and transistor 12 is on saturation. Then the voltage Vout at the emitter of transistor 12 is equal to the voltage of the collector of transistor 12 which is the output terminal 14 and is given by the formula $$V_E{}^+ = \frac{R15 \times Vcc}{R15 + R16} \text{ where}$$

R 15 and R 16 represent the resistance of resistors 15 and 16.

In input waveform Vin which is applied at input terminals 13 is coupled to the base of transistor 11 by resistor 17. When the voltage at the base of transistor 11, reaches $V_E$, base current will flow into transistor 11 and as this current becomes larger, transistor 11 will conduct causing the voltage at the collector of transistor 11 to decrease. The voltage at the base of transistor 12 is dependent on the voltage at the collector of transistor 11 and is determined by the relative value of resistors 18 and 19 which form a voltage divider network. As transistor 11 continues to conduct the voltage at the collector of transistor 11 continues to decrease as does the voltage at the base of transistor 12 until transistor 12 cuts off. The cutoff transistor 12 allows the voltage $V_E$ at the emitter of transistor 12 to drop and transistor 11 to saturate. The voltage Vout at the collector of transistor 12 which is one of the output terminals 14 jumps to the power supply voltage Vcc since transistor 12 is cut off. The new value of VE is now $$VE = \frac{R15 \times Vcc}{R15 + R20}$$

where $R_{20}$ represents the resistance value of resistor 20.

When the input voltage Vin decreases so that the voltage at the base of transistor 11 decreases to the level of $V_E$, the base current will no longer hold transistor 11 in saturation and the circuit will revert to the original state causing the signal at the output terminal to drop to the level of the voltage at the emitter of transistor 12.

While the switching or threshold levels for the Schmitt trigger circuit shown in FIG. 1 remain fixed, and are determined by the circuit parameters, these levels may be automatically varied in a number of ways. External control signals may be impressed through suitable coupling means at various points in the circuit. One such point is the junction of the emitters of transistors 11 and 12. If the control signal raises the voltage $V_E$ at the junction of the emitter of transistors 11 and 12 then the circuit will change states to a high-level output signal at a higher voltage level input Vin which will occur at a later time on the input signal cycle then when no control signal was impressed. Thus, the level and time at which the Schmitt trigger changes states may be externally controlled without physically varying circuit components.

Figure 3:
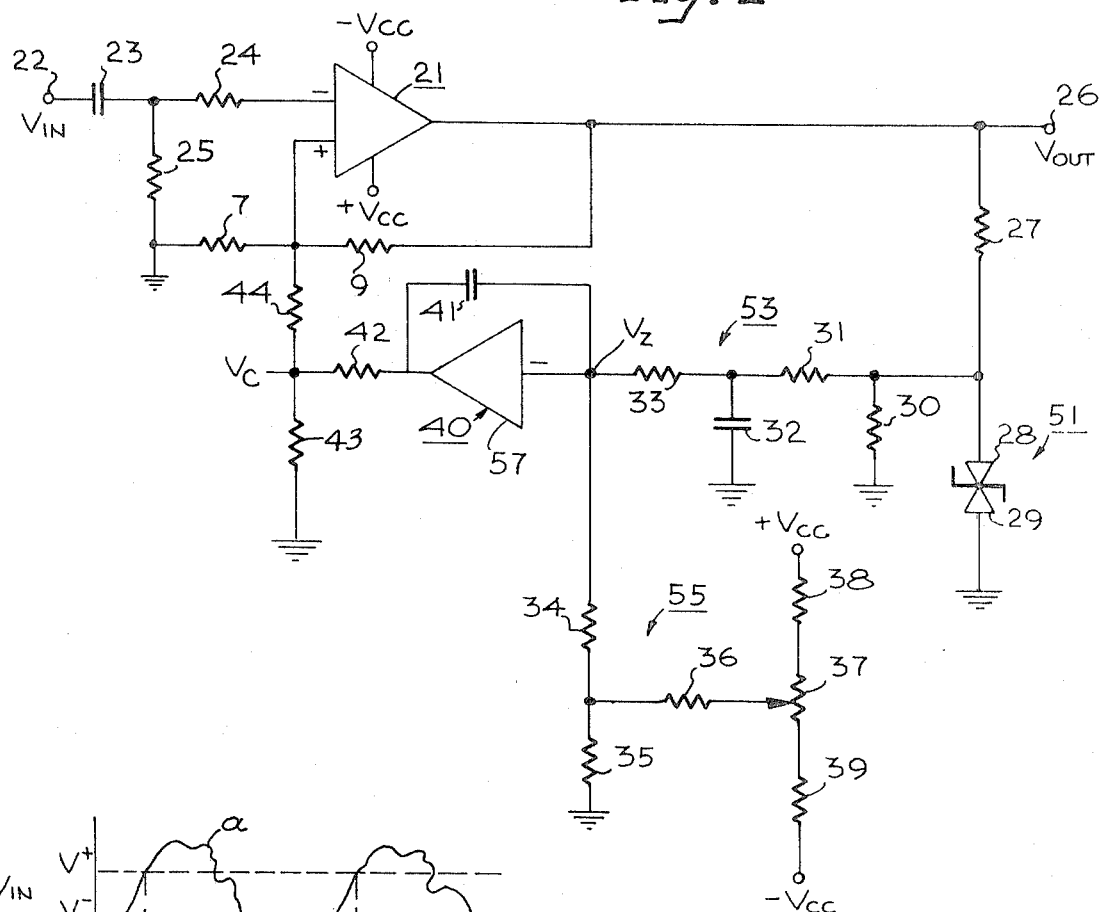
FIG. 3 is a circuit diagram of one embodiment of the present invention.

Referring now to FIG. 3, there is shown one embodiment of the present invention in which a DC operational amplifier 21 is utilized as a Schmitt trigger 21. The Schmitt trigger 21 is coupled to the sources of positive and negative DC power, +Vc1 and −Vcc, respectively. The periodically repetitive input signal is impressed on Terminal 22 which is connected to the negative input terminal. Capacitor 23 and resistor 24 couple the input signal into the Schmitt trigger 21 circuit. Resistor 25 is connected between the junction of capacitor 23 and resistor 24 and ground. Resistor 25 serves to match the input load as seen by the input signal source and to provide an input path to ground. The hysteresis of the operational amplifier utilized as Schmitt trigger 21 is a function of the ratio of the resistance of resistor 7 to the sum of resistances of resistors 7 and 9.

The output of Schmitt trigger 21 is connected to output terminal 26 and to one side of resistors 27 and 9. The other side of resistor 27 is connected to a clipping means 51 comprising zener diodes 28 and 29 at the anode of zener diodes 28. Zener diodes 28 and 29 are connected in series and opposition. The anode of zener diode 29 is connected to ground. This arrangement of the zener diodes 28 and 29 serves to clip both the negative and positive segments of the output signal of Schmitt trigger 21 that is transferred to the zener diodes 28 and 29 through resistor 27. The anode of zener diode 28 is connected to one side of resistors 30 and 31. The other side of resistor 30 is connected to ground potential while the other side of resistor 31 is connected to one side of capacitor 32 and resistor 33. The other side of capacitor 32 is connected to ground potential.

Zener diodes 29 and 29 function properly as a clipping circuit only when the output is essentially unloaded. The network comprised of resistor 31, capacitor 32 and resistor 33 serves as an isolation and high-frequency suppression means 53 to isolate zener diodes 28 and 29 and to provide suppression of high-frequency spikes caused by the finite switching times of the zener diodes 28 and 29.

The second side of resistor 33 is connected to the summing junction of an integrator means, in this embodiment, comprising an operational integrator 40, which may comprise an operational amplifier 57. One side of resistor 36 is connected to a balancing and compensation means 55 comprising resistors 34, 35, 38 and 39 and potentiometer 37 through the wiper element of potentiometer 37. The other two terminals of potentiometer 37 are individually coupled through resistors 38 and 39 to sources of positive, +Vcc, and negative, −Vcc, DC potential, respectively. By means of this arrangement the voltage level of the wiper element of potentiometer 37 can be varied as the position of the wiper is physically varied. The resulting voltage is applied to the second side of resistor 33 and into the summing junction of operational integrator 40, through summing resistor 34 and divider resistor 35, which is connected to ground so as to compensate for differences in the zener voltages of diodes 28 and 29, and for initial input offset voltage and current of operational integrator 40.

Capacitor 41 forming a part of operational integrator 40 is connected between the input and output of operational amplifier 57 so as to integrate the stepped output of zener diodes 28 and 29. Resistor 33 also serves as an element of the integrating network of the operational integrator 40 in conjunction with capacitor 41.

The time constant of the integrating network and hence the smoothness of the integration is dependent on the product of the resistance value of resistor 33 and capacitance of capacitor 41.

The output of operational integrator 40 is connected to one side of resistor 42. The other side of resistor 42 is coupled to one side of resistors 43 and 44. The other side of resistor 43 is connected to ground potential while the other side of resistor 44 is connected to the positive input or threshold level control of the operational amplifier Schmitt trigger 21, and to one side of resistor 7 and one side of resistor 9. The other side of resistor 7 is connected to ground potential and the other side of resistor 9 is connected to the output of the operational amplifier Schmitt trigger 22.

Figure 4:
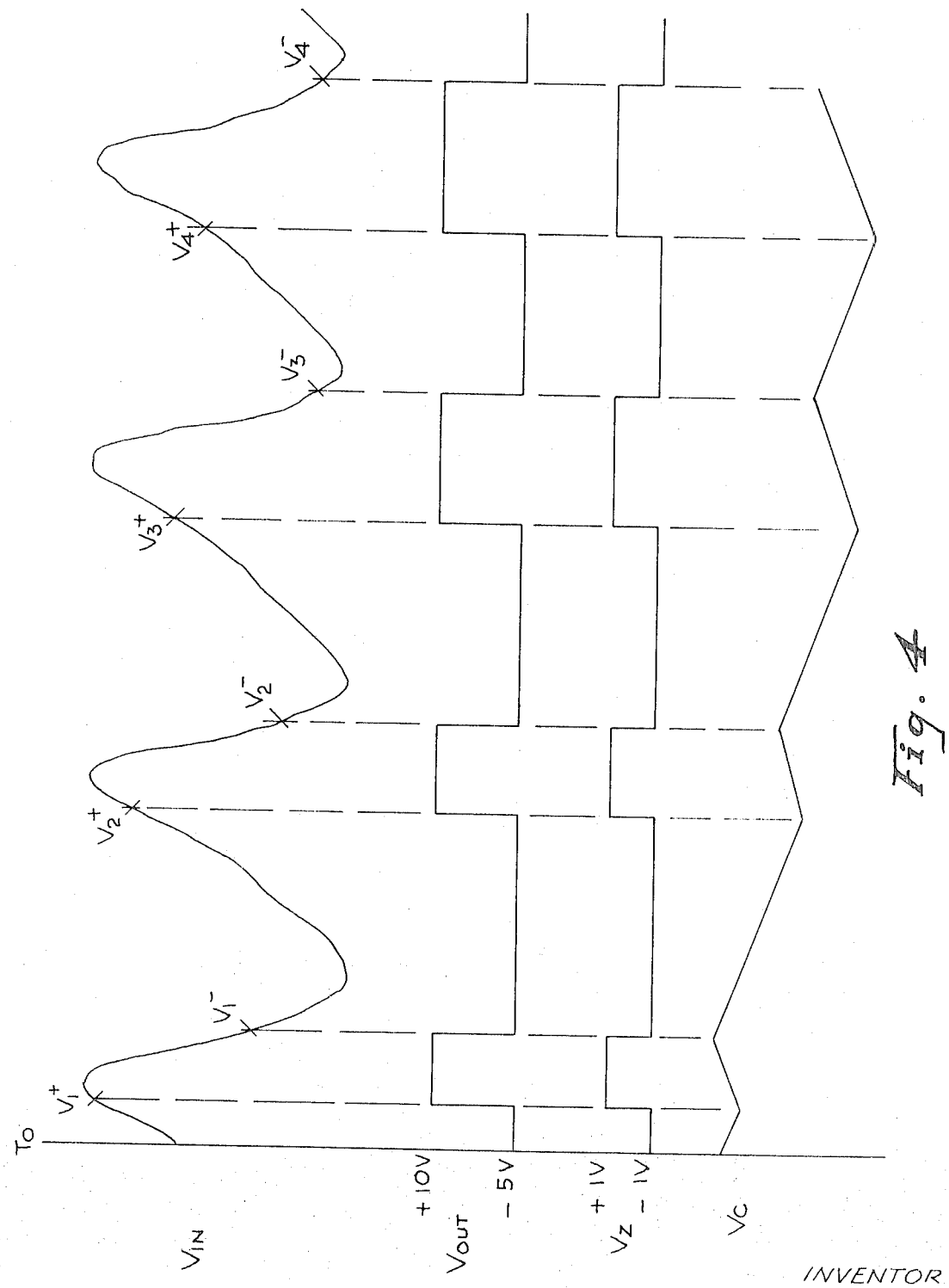
FIG. 4 is a graphical representation of signals that would be produced in the circuit shown in FIG. 3 at the points indicated from the input signal shown.

The operation of the invention as shown in FIG. 3 can best be understood with reference to FIG. 4. Assuming that periodically repetitive input signal shown as Vin is applied to input terminal 22 and that the threshold levels of Schmitt trigger 21 initially are such that it changes states at points $V_1^+$ and $V_1^-$ on the input signal. Then the output of Schmitt trigger 21 that appears at terminal 26 would be such as that represented by Vout. For the purposes of this discussion the high- and low-level output states of Schmitt trigger 21 were chosen as +10 and −5 volts, respectively. In practice, the output levels could be of any values and would be dependent on the actual values of the components utilized in Schmitt trigger 21 circuit and the value of the control signal applied through resistor 44.

The portion of output signal Vout that is coupled to the zener diode clipping network is shown as Vz. This signal that appears at the anode of zener diode 28 is a clipped version of Vout with the negative and positive levels equal in magnitude, in this case 1 volt. While a zener diode clipping network has been shown in the illustrative embodiment, other types of clipping devices could be utilized to present a balanced signal to the input of operational integrator 40.

As is shown in FIG. 4, the initial output signal Vout is not a square-wave output and if no feedback were employed the output would continue as a nonsquare-wave signal.

While the integrator portion of the feedback network shown in the illustrative embodiment is an operational integrator 40, it will be appreciated that other types of integration devices may be used, such as Miller or bootstrap integrators. The invention even contemplates the use of digital integrators.

If the clipped version Vz of the output signal Vout were applied to the input of operational integrator 40 without capacitor 41 coupled between the input and output of operational integrator 40, the output Vc would be a stepped output signal having its leading and trailing edges coincide with those of the input signal Vz. Since the voltage across a capacitor cannot change instantaneously, the coupling of capacitor 41 between the input and output of operational integrator 40 results in a ramplike signal as shown in FIG. 4 as Vc. When the input signal to the operational integrator 40 causes the circuit to switch to its high-level output state, capacitor 41 prevents the instantaneous achievement of this level. Instead the signal Vc at the output of operational integrator 40 linearly rises toward the voltage level of the high state. When operational integrator 40 is switched to its low-output state, the capacitor 41 again prevents the immediate assumption of the low-output state and results in the output Vc linearly decreasing toward the voltage level of the low state as shown in FIG. 4, the above rates of increase and decrease being dependent only on the product of resistor 33 and capacitor 41.

The output of operational integrator 40 is connected to the threshold level control of Schmitt trigger 21 so that the signal shown as Vc is impressed on the level control.

This connection results in the points on the input waveform Vin at which Schmitt trigger 21 changes states varying in accordance with the level of control signal Vc. In the illustrative example shown, Vout is at the low level for a longer time than it is at the high level resulting in a nonsquare-wave output. This also results in Vc decreasing for a longer time than it increases, producing an increasingly lower level for Vc. This lower level of Vc reduces the threshold levels of Schmitt trigger 21 so that the circuit changes states at $V_2^+$ and $V_2^-$ which are lower than $V_1^+$ and $V_1^-$, respectively. The lowering of the threshold levels causes Schmitt trigger 21 to switch to the high-level output earlier and maintain it longer thereby producing a wider positive output signal Vout and one that approaches a square-wave output.

As is shown in FIG. 4, Vout is still not a square-wave signal following the transitions at $V_2^+$ and $V_2^-$. Since Vout is still in the low level for a longer time than in the high level, Vc continues to decrease resulting in even lower threshold levels for Schmitt trigger 21. The new threshold points $V_3^+$ and $V_3^-$ cause Schmitt trigger 21 to switch to the high-level output even earlier and to maintain it longer so that the output signal Vout further approaches a square-wave signal.

As more cycles of Vin are received, the feedback operation, as described, results in a substantially square-wave output signal Vout. Any deviations in the square-wave output Vout result in a variation in control signal Vc which in turn raises or lowers the threshold levels of Schmitt trigger 21 so as to automatically return the output signal Vout to a square-wave signal.

Thus, in the embodiment shown, the Schmitt trigger 21 provides a stepped output signal and the feedback means, which comprises the voltage clipping means 51, high-frequency suppression and isolation means 53, operational integrator 40, and balancing and compensation means 55, provides the threshold level control signal to control the Schmitt trigger output to a 50—50 square-wave output.

While the illustrative embodiment shown in FIG. 3 was discussed as having the threshold control vary both the high and low threshold points simultaneously, the control could be connected so as to vary only the high point or low point or both points independently.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A square-wave generator responsive to an input signal of periodic frequency for producing a substantially square-wave output signal comprising:
   a primary Schmitt trigger providing a high-level state and a low-level state output signal and having switching levels and adapted to receive the input signal and having:
   an output terminal providing said output signal;
   a threshold level control input adapted to receive level control input signals to control the switching levels of the primary Schmitt trigger; and
   feedback means coupled between the output terminal and the threshold level control input of the primary Schmitt trigger responsive to the relative duration of the high- and low-level states of the primary Schmitt trigger output, whereby control signals are developed to vary the threshold levels of the primary Schmitt trigger so as to result in a square-wave output.

2. square-wave generator according to claim 1 wherein the feedback means comprises:
   voltage clipping means coupled to the output of the primary Schmitt trigger and generating an output signal therefrom providing a clipped version of the Schmitt trigger output signal; and
   integrator means having an input terminal coupled to the output of the voltage clipping means and an output coupled to the threshold level control of the primary Schmitt trigger for producing a threshold level control signal representing an integrated version of the output of the voltage clipping means.

3. A square-wave generator according to claim 2 wherein:
   the voltage clipping means includes a pair of zener diodes connected in series and in opposition with the anode of one zener diode coupled to the output of the primary Schmitt trigger means and the anode of the other zener diode adapted for connection to ground potential.

4. A square-wave generator according to claim 2 wherein the integrator means is an operational integrator comprising:
   an operation amplifier connected to receive the output of the voltage clipping means, having its output connected to the threshold level control input of the primary Schmitt trigger;
   a resistor connected to the input of said operational amplifier;
   a capacitor connected between the input and output of the operational amplifier and said resistor and said capacitor comprising and integrating network having a predetermined time constant; and
   said primary Schmitt trigger comprises a DC operational amplifier.

5. A 50—50 square-wave generator comprising, in combination;
   a first DC operational amplifier Schmitt trigger having an input terminal for receiving a periodic repetitive input signal, a threshold level control terminal and an output terminal providing an output signal;
   clipping means connected to said output terminal of said first DC operational amplifier for receiving said output signal and generating a clipped signal in response thereto;
   an operational integrator means for receiving said clipped signal at an input terminal thereof and generating a threshold control signal in response thereto at an output terminal thereof and said operational integrator means connected to said threshold control terminal of said first DC operational amplifier, whereby said first DC operational amplifier output signal is a square-wave signal.

6. The arrangement defined in claim 5 and further comprising:
   a high-frequency suppression and isolation means connected to said clipping means.

7. The arrangement defined in claim 5 and further comprising:
   balancing and compensation means connected to said clipping means and to said input terminal of said operational integrator.

8. The arrangement defined in claim 7 wherein:
   said operational integrator means comprises:
   an operational amplifier having said input and output terminals;
   a capacitor connected between said input and output terminals; and
   a resistor connected to said input terminal and said clipping means for receiving said clipped signal from said clipping means.

9. The arrangement defined in claim 7 wherein:
   said clipping means comprises a pair of zener diodes connected in series and in opposition.

* * * * *